(12) United States Patent
Vittitoe

(10) Patent No.: US 10,659,647 B1
(45) Date of Patent: May 19, 2020

(54) SYSTEMS AND METHODS OF PROCESSING A DOCUMENT IN AN IMAGING DEVICE

(71) Applicant: Lexmark International, Inc., Lexington, KY (US)

(72) Inventor: Neal Fredrick Vittitoe, Lexington, KY (US)

(73) Assignee: LEXMARK INTERNATIONAL, INC., Lexington, KY (US)

(*) Notice: Subject to any disclaimer, the term of this patent is extended or adjusted under 35 U.S.C. 154(b) by 0 days.

(21) Appl. No.: 16/227,717

(22) Filed: Dec. 20, 2018

(51) Int. Cl.
*H04N 1/32* (2006.01)
*H04N 1/393* (2006.01)
*H04N 1/00* (2006.01)
*G06F 17/28* (2006.01)

(52) U.S. Cl.
CPC ....... *H04N 1/32149* (2013.01); *G06F 17/289* (2013.01); *H04N 1/00244* (2013.01); *H04N 1/393* (2013.01)

(58) Field of Classification Search
None
See application file for complete search history.

(56) References Cited

U.S. PATENT DOCUMENTS

| | | | |
|---|---|---|---|
| 2016/0055477 A1* | 2/2016 | Guerin | G06Q 20/202 705/21 |
| 2019/0044727 A1* | 2/2019 | Scott | H04L 9/0891 |

\* cited by examiner

*Primary Examiner* — Lennin R RodriguezGonzalez

(57) ABSTRACT

An imaging device and a method of processing a document at the imaging device which includes receiving a message associated with the document, transmitting the message to a server communicatively connected to the imaging device, receiving an identifier of the message as stored in the server, converting the identifier to an image scannable by a mobile device, and adding the image to an output page of the document. An input language and an output language of the message associated with the document may be predetermined or may be received from a user of the imaging device.

18 Claims, 5 Drawing Sheets

SYSTEMS AND METHODS OF PROCESSING A DOCUMENT IN AN IMAGING DEVICE

CROSS REFERENCE TO RELATED APPLICATIONS

This patent application is related to U.S. patent application Ser. No. 16/227,759, filed contemporaneously herewith, entitled "SYSTEMS AND METHODS OF PROCESSING A DOCUMENT IN AN IMAGING DEVICE", which is assigned to the assignee of the present application.

STATEMENT REGARDING FEDERALLY SPONSORED RESEARCH OR DEVELOPMENT

None.

REFERENCE TO SEQUENTIAL LISTING, ETC

None.

BACKGROUND

1. Technical Field

The present invention relates to printing documents and, more particularly, to methods of printing content associated with a document processed in an imaging device.

2. Description of the Related Art

Language barriers typically exist in multi-cultural environments, such as schools and industries, where senders and receivers may speak, read and/or write in different languages. When trying to communicate effectively with people having another language background, there is that risk that messages may not be understood by the receiving party or may be misinterpreted and ignored. In schools, for example, immigrant parents may be able to understand little to no English contained in a broad range of communications sent by the school such as, but not limited to, flyers or waivers for an upcoming class trip, party, or other activities. While services exist to attempt to bridge this school-parent communication barrier, school systems struggle with the number of families or recipients as well as the broad range of languages which need to be supported for any given school communication in order to reach the largest number of recipients.

Depending upon the circumstances, failure to communicate effectively due to inappropriate support for certain language services may cause legal concerns, such as violations of parental civil rights. Systems in other industries, such as hospitals and banks, may also face similar challenges. Consequently, industries may feel social and legal pressures to identify effective solutions to help overcome this communication problem.

One method of providing translations to documents may involve the use of optical character recognition or OCR. A machine having an OCR function detects text on pre-printed documents and may be configured to determine a translation of the detected text. Since a translation of the document depends upon the detected text, there may be instances where the translation of the document may not be possible because the detected text is indiscernible. Recognition of content and translation of the full content of the document may also consume time. A larger dictionary or a more complex vocabulary of a language may be required to produce more accurate translations of the recognized text. Since documents may be provided to people of many different language backgrounds, manually processing pre-printed documents via OCR from one language to a plurality of other pre-identified languages may be time consuming.

There is, therefore, a need to employ more efficient systems and methods for producing communications for users of different language backgrounds.

SUMMARY

Example methods for processing a document in an example imaging device as well as an imaging device having a non-transitory computer-readable storage medium containing one or more instructions for processing the document are disclosed.

One example method for processing a document in the example imaging device includes receiving a message associated with the document, transmitting the message to a server communicatively connected to the imaging device, receiving an identifier of the message as stored in the server, converting the identifier to an image scannable by a mobile device, and adding the image to a page of the document.

Another example embodiment of a method for processing a document in the imaging device includes receiving an output language together with the message, sending the message and the output language to a server communicatively connected to the imaging device, receiving an identifier of a translation of the message in the output language from the server, generating a scannable image using the identifier, and adding the scannable image to an output page. Such output page may be an output page of the document.

In other example embodiments, the scannable image corresponding to the identifier of the message may be added to a page separate from the output document page instead of on the output document page itself. At least one of an input language and an output language for the message associated with the document may be sent to the server. The scannable image may be added to a predetermined portion of a document page and/or to a selected page(s) of the document. The scannable image may lead a receiver of the document to the message or to a translation of the message in an audio or text format.

Additional features and advantages of various example embodiments will be better understood in view of the detailed description provided below.

BRIEF DESCRIPTION OF THE DRAWINGS

The above-mentioned and other features and advantages of the present disclosure, and the manner of attaining them, will become more apparent and will be better understood by reference to the following description of example embodiments taken in conjunction with the accompanying drawings. Like reference numerals are used to indicate the same element throughout the specification.

DETAILED DESCRIPTION OF THE DRAWINGS

Figure 1:
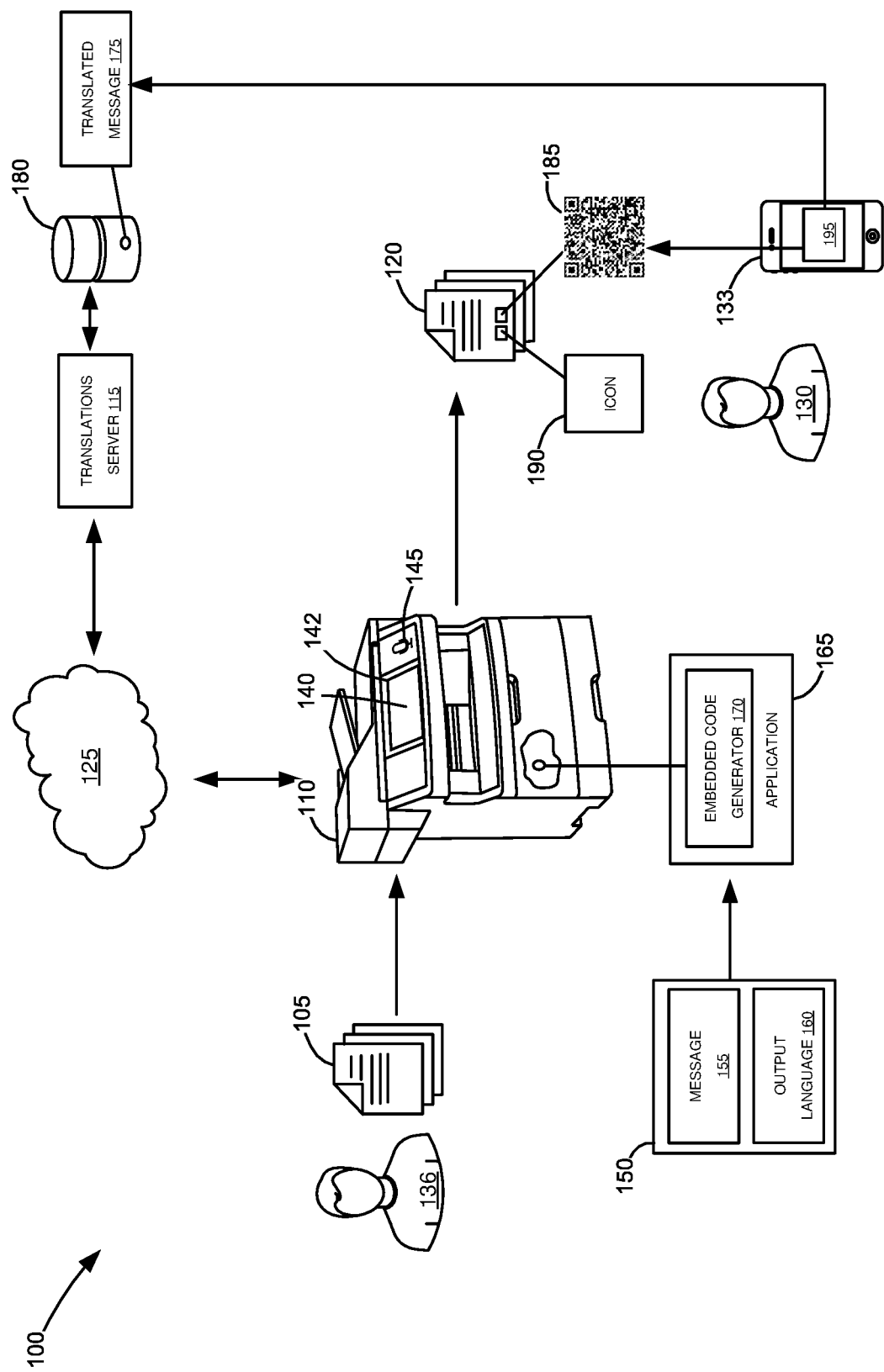
FIG. 1 is a diagram illustrating an example system for providing additional data to a document for printing.

It is to be understood that the disclosure is not limited to the details of construction and the arrangement of components set forth in the following description or illustrated in the drawings. The disclosure is capable of other example embodiments and of being practiced or of being carried out in various ways. For example, other example embodiments may incorporate structural, chronological, process, and other changes. Examples merely typify possible variations. Individual components and functions are optional unless explicitly required, and the sequence of operations may vary. Portions and features of some example embodiments may be included or substituted for those of others. The scope of the present disclosure encompasses the appended claims and all available equivalents. The following description is, therefore, not to be taken in a limited sense, and the scope of the present disclosure is defined by the appended claims.

Also, it is to be understood that the phraseology and terminology used herein is for the purpose of description and should not be regarded as limiting. The use herein of "including", "comprising", or "having" and variations thereof is meant to encompass the items listed thereafter and equivalents thereof as well as additional items. Further, the use of the terms "a" and "an" herein do not denote a limitation of quantity but rather denote the presence of at least one of the referenced item.

In addition, it should be understood that example embodiments of the disclosure include both hardware and electronic components or modules that, for purposes of discussion, may be illustrated and described as if the majority of the components were implemented solely in hardware.

It will be further understood that each block of the diagrams, and combinations of blocks in the diagrams, respectively, may be implemented by computer program instructions. These computer program instructions may be loaded onto a general-purpose computer, special purpose computer, or other programmable data processing apparatus to produce a machine, such that the instructions which execute on the computer or other data processing apparatus may create means for implementing the functionality of each block or combinations of blocks in the diagrams discussed in detail in the description below.

These computer program instructions may also be stored in a non-transitory computer-readable medium that may direct a computer or other programmable data processing apparatus to function in a particular manner, such that the instructions stored in the computer-readable medium may produce an article of manufacture, including an instruction means that implements the function specified in the block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus implement the functions specified in the block or blocks.

Accordingly, blocks of the diagrams support combinations of means for performing the specified functions, combinations of steps for performing the specified functions, and program instruction means for performing the specified functions. It will also be understood that each block of the diagrams, and combinations of blocks in the diagrams, may be implemented by special purpose hardware-based computer systems that perform the specified functions or steps or by combinations of special purpose hardware and computer instructions.

FIG. 1 is a diagram illustrating one example system 100 for providing additional data to a document for printing. Example system 100 includes an input document 105, an imaging device 110, a translations server 115 and an output document 120. Imaging device 110 may be communicatively connected to translations server 115 through a network 125 which may be a wired connection, wireless connection, or a combination of both. Input document 105 may be a pre-printed or an electronic document. In the present disclosure, imaging device 110 may process input document 105 to generate output document 120. A receiver 130 may use a computing device 133 to process content on output document 120.

Input document 105 may be a single-page document or a multiple-page document. In one example embodiment, input document 105 may be a pre-printed document for processing in imaging device 110, such as a scan job or a copy job. In one example aspect of this embodiment, an individual or user, such as an owner 136 of input document 105, may place input document 105 on a scan area of imaging device 110 as a scan job for producing a scanned image of input document 105. In another example aspect, owner 136, of input document 105 may place input document 105 on a copy area of imaging device 110, such as a copy job for producing another printed copy or output of input document 105.

In other example embodiments, input document 105 may be an electronic document stored in a storage medium separate from imaging device 105, such as a memory stick (not shown). In yet other example embodiments, input document 105 may be stored in a memory of a computing device (not shown) communicatively connected to imaging device 110. Input document 105 may be viewed via an application (e.g., application 165) on imaging device 110. In one example aspect, the storage medium or the computing device may provide input document 105 in a printable format to imaging device 110 when sending input document 105 to imaging device 110 for printing. In another example aspect, the storage medium or the computing device may convert input document 105 to a printable format prior to or while sending input document 105 to imaging device 110. In other example aspects, imaging device 110 may be configured to accept input document 105 regardless of its format. In still other example aspects, imaging device 110 may include instructions to convert input document 105 to a printable format prior to printing.

For purposes of discussing the present disclosure, owner 136 of input document 105 may also be referred to as an owner of imaging device 110. However, it will be understood that in other example embodiments not shown, owner 136 of input document 105 may not be the owner of imaging device 110. In some example embodiments, input document 105 may be sent for processing by imaging device 110 by another user (not shown) besides owner 136.

Imaging device 110 may be a single-function printing device, according to one example embodiment. In other example embodiments, imaging device 110 may be a multi-function device capable of other functions in addition to printing, such as scanning, copying, faxing, e-mailing and the like. In one example embodiment, imaging device 110 may include a keypad 140. Keypad 140 may be comprised of numbers, letters, symbols, and/or other characters. Keypad 140 may be a physical component on imaging device 110. In some example aspects, keypad 140 may be part of a display screen 142, such as a touch screen panel, of imaging device 110, as shown in FIG. 1. Keypad 140 may be utilized by a user of imaging device 110 (e.g., owner 136) to input text on imaging device 110.

In another example embodiment, imaging device 110 may include an audio receiving device 145, such as a microphone 145. Microphone 145 may be utilized by a user of imaging device to input voice data on imaging device 110. Keypad 140 and/or microphone 145 may be removable components from imaging device 110. Keypad 140 and/or microphone 145 may be utilized by owner 136 to transmit an instruction 150 to imaging device 110. Instruction 150 may be associated with input document 105. In other example embodiments, instruction 150 may be provided from the computing device where input document 105 originated (not shown) and not via imaging device 110.

Instruction 150 may include a message 155 and an output language 160. Message 155 may be a text message, a voice message, or a combination of both. Message 155 may be a set of instructions related to input document 105. Keypad 140 may be utilized by owner 136 to input a text message 155. Microphone 145 may be utilized by owner 136 to input a voice message 155. Output language 160 may be indicated via keypad 140 or microphone 145 on imaging device 110. Message 155 may be limited to a predetermined number of words or characters. Output language 160 may be a language desired by owner 136 for translating message 155. For example, when message 155 is in English, owner 136 may set output language 160 to French. Owner 136 may select output language 160 depending on a language background of receiver 130. Imaging device 110 may provide a set of prompts on display screen 142 for owner 136 to indicate message 155 is associated with input document 105 and output language 160 for message 155. While output language 160 is shown as part of instruction 150, instruction 150 may include only message 155 in some other example embodiments. For example, output language 160 may be a predetermined language in example system 100.

Imaging device 110 may include an application 165. Application 165 may include an instruction to identify input document 105. Application 165 may include an instruction to receive message 155 and output language 160 (together forming instruction 150) associated with input document 105 via keypad 140 and/or microphone 145 of imaging device 110. Application 165 may set a character limit for message 155. Application 165 may also set a predetermined list of languages for selection as output language 160. Application 165 may include one or more instructions for performing a method of printing instructions associated with input document 105, as will be discussed in greater detail below.

Application 165 may include a machine-readable image or code generator 170. In one example embodiment of the present disclosure, generator 170 may be a module in imaging device 110. In another example embodiment, generator 170 may be a module separate from imaging device 110 but accessible through application 165. Generator 170 may include an instruction to generate a code 185 readable or otherwise capable of being interpreted by computing device 133. Code 185 may be associated with or connected to an identifier of translated message 175 as stored in a database or other storage medium 180. In one example embodiment and as illustrated in the present disclosure, code 185 may be a QR code 185. Besides QR code 185, other types of encoding mechanisms which direct computing device 133 to translated message 175 may be practiced or used.

Translations server 115 may be a server communicatively connected to application 165 in imaging device 110. Translations server 115 may include an instruction to convert message 155 from its original language to output language 160. Translations server 115 may receive instruction 150 (message 155 and output language 160) from application 165. Following receipt of instruction 150, translations server 115 may determine output language 160 and may then translate message 155 to output language 160. In one example embodiment, translations server 115 may include an instruction to determine an original language of message 155 prior to translating message 155 to output language 160. In another example embodiment, imaging device 110 may receive from owner 136 the original language of message 155 as an input language and send the original language to translations server 115. In some other example embodiments, output language 160 may be preset in translations server 115 or in application 165 of imaging device 110. A translated message 175 may be generated by translations server 115 as a result of translating message 155 to output language 160. Translations server 115 may include database 180 for storing translated message 175.

Output document 120 may be a document resulting from processing input document 105. Output document 120 may be a printed document or an electronic document stored in imaging device 110 or in database 180. In one example embodiment, output document 120 may include content of input document 105 and QR code 185. In another example embodiment, output document 120 may include content of input document 105 and translated message 175. In other example embodiments, output document 120 may refer to a page separate from a page of input document 105 and including QR code 185. In yet other example embodiments, output document 120 may refer to a page separate from a page of input document 105 and including only translated message 175. In some example aspects, output document 120 may further include a translation icon 190. Translation icon 190 may be positioned adjacent QR code 185 to complement QR code 185. Translation icon 190 may be an icon indicating translation of message 155 from one language to output language 160. For example, where QR code 185 links to a translation of an English message 155 to French, translation icon 190 may visually indicate that translated message 175 linked to QR code 185 is a translation of an English message into the French language. Translation icon 190 may be predetermined by application 165. Translation con 190 may be based upon an original language of message 155 and output language 160. Other visual representations to indicate a nature of QR code 185 besides translation icon 190, such as whether it links to a text translation or an audio translation, may be apparent to those skilled in the art.

Computing device 133 may be a computing device owned by receiver 130. Computing device 133 may be a mobile device, such as a laptop, a smartphone, or a tablet. In some alternative example embodiments, computing device 133 may be a workstation computer. In one example embodiment of the present disclosure, computing device 133 may be equipped with a reader 195. In one example embodiment, reader 195 may be an application installed in computing device 133 which includes instructions to detect and read or scan an image or code on a printed document, such as QR code 185 on output document 120. While scanning QR code 185 on output document 120, reader 195 may execute a page linking to translated message 175 in database 180 of translations server 115.

Output document 120 may include the same content as input document 105. In some example aspects, output document 120 may include an identifier (e.g., QR code 185) linking to translated message 175 or linking to translated message 175 itself. For example, input document 105 may be a waiver for a class activity. The class instructor may send input document 105 to imaging device 110, along with instruction 150 stating, "Please sign the document on the line highlighted in yellow to allow your child to attend the class trip to the city zoo this coming Monday" (message 155) for translation to French (output language 160). Imaging device 110 may print output document 120 including QR code 185, which is generated based upon instruction 150. Following receipt of output document 120 and upon seeing QR code 185 on output document 120, receiver 130 may scan QR code 185 using reader 195 in computing device 133 to view or otherwise access translated message 175. Since translated message 175 may coincide with a language background of receiver 130, translated message 175 may allow receiver 130 to understand how to manage output document 120 or, more specifically, what action to perform. In some example embodiments, translated message 175 may provide receiver 130 with information receiver 130 needs to know.

Figure 2:
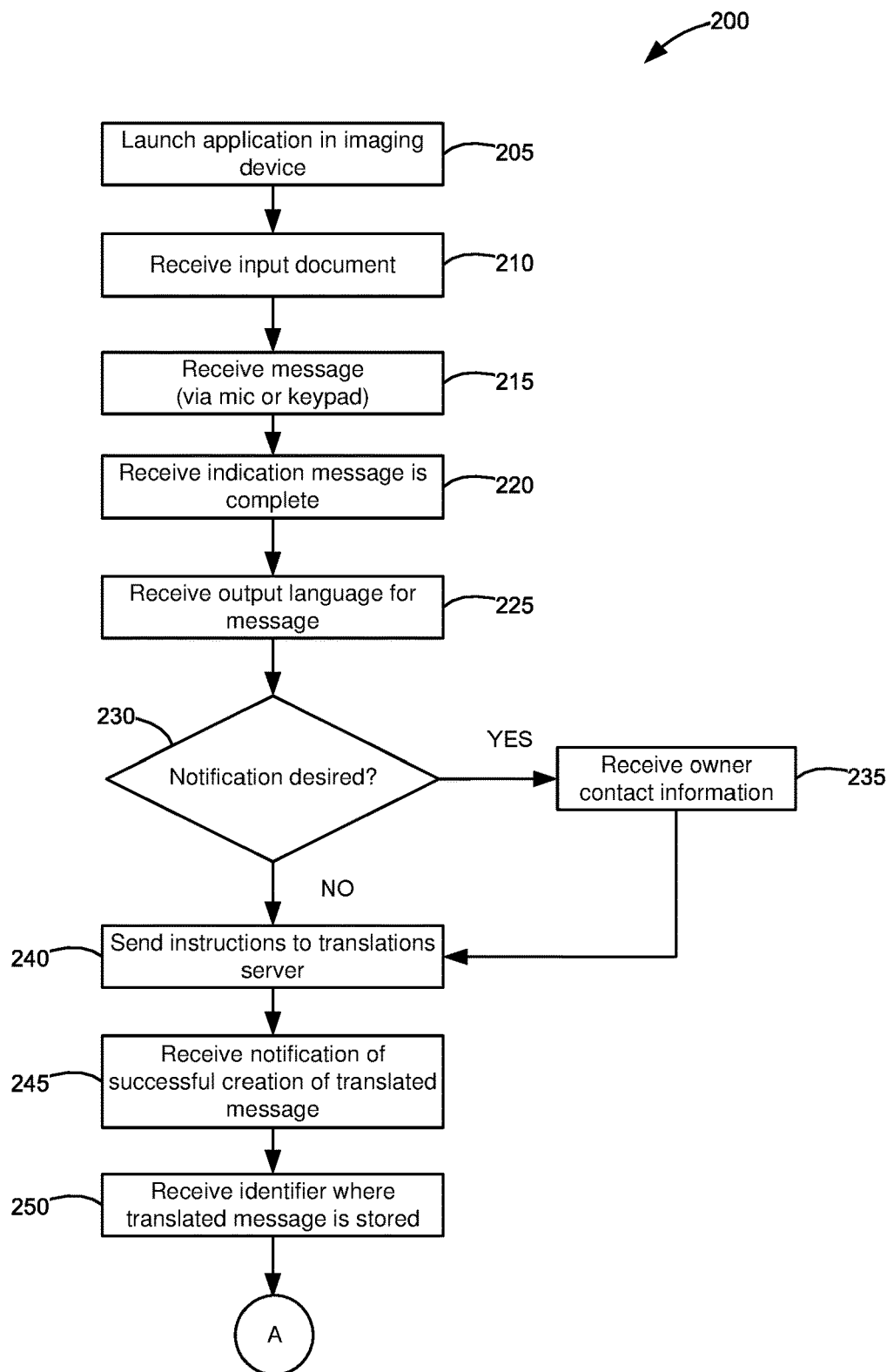
FIG. 2 is a flowchart of one example method for generating a translated message associated with the document in FIG. 1.

FIG. 2 is a flowchart of one example method 200 for generating translated message 175 associated with input document 105 in FIG. 1. Blocks 205-250 will be discussed in conjunction with the components shown in FIG. 1. Example method 200 may be performed by application 165 in imaging device 110.

At block 205, application 165 may be launched in imaging device 110. Application 165 may be launched by a user of imaging device 110 or owner 136 of input document 105. In one example embodiment, owner 136 may send input document 105 from a computing device (not shown) to imaging device 110 as a print job and may then access input document 105 in imaging device 110 via application 165. In another example embodiment, owner 136 may launch application 165 and retrieve input document 105 from a storage location (not shown) communicatively connected to imaging device 110. Application 165 may include a set of user interfaces for displaying on display screen 142 of imaging device 110. For example, a first user interface may request an identifier of input document 105 from owner 136, a second user interface may request message 155 associated with input document 105 while a third user interface may request output language 160 for translating message 155. Output language 160 may be based on a language background of receiver 130.

At block 210, application 165 may receive input document 105. As discussed above, input document 105 may be a print job, a scan job, or another type of job for processing by imaging device 110. As described in connection with FIG. 1, input document 105 may be a pre-printed document. In other example embodiments, input document 105 may be an electronic document sent by a computing device (not shown) to imaging device 110 and/or selected by owner 136 on imaging device 110 via application 165.

At block 215, application 165 may receive message 155. In one example embodiment, message 155 may be entered by owner 136 via keypad 140 on imaging device 110. In another example embodiment, message 155 may be entered via microphone 145 on imaging device 110. In other example embodiments, message 155 may be a combination of user inputs from keypad 140 and microphone 145.

At block 220, application 165 may receive an indication that message 155 is complete or that owner 136 has completed entering message 155 on imaging device 110. In one example embodiment, a button may be provided on display screen 142 of imaging device 110 for owner 136 to indicate when message 155 is complete. In another example embodiment, application 165 may be configured to determine that message 155 is complete when message 155 reaches a predetermined character limit. In other example embodiments, application 165 may determine that message 155 is complete when owner 136 or another user of imaging device 110 has entered a predetermined character or symbol on display screen 142 of imaging device 110. For example, application 165 may be configured to determine that message 155 is complete when a period or dot character is detected when message 155 is entered via keypad 140.

At block 225, application 165 may receive output language 160. Another screen display including a set of predetermined languages may be provided on display screen 142 for owner 136 to select output language 160. Application 165 may also receive an indication from owner 136 that a language among the set of predetermined languages has been selected as output language 160. For example, application 165 may be configured to determine which among the predetermined languages displayed on display screen 142 has been selected or tapped by owner 136. In other example embodiments, output language 160 may be predetermined by application 165. For example, output language may be set to French in a server (not shown) communicatively connected to application 165 and may be reset to another language anytime.

At block 230, application 165 may determine whether a notification is desired by owner 136 so owner 136 may be informed that translated message 175 has been accessed (e.g., listened to or viewed) by receiver 130 via QR code 185 on output document 120. At block 235, following a determination that a notification is desired by owner 136, owner 136 may input his or her contact information in application 165, such as an e-mail address or a mobile phone number. Another screen may be displayed on display screen 142 for owner 136 to input his or her contact information. Other methods for tracking access of translated message 175 stored in database 180 may be based upon a designer's choice.

At block 240, application 165 may send instruction 150 (comprising message 155 and output language 160) to translations server 115. Block 240 may be performed following a determination that a notification is not desired. In some example alternate embodiments, block 240 may be performed following receipt of contact information from owner 136 (block 235). In some example aspects, application 165 may send the contact information received at block 235 along with instruction 150.

At block 245, application 165 may receive a notification from translations server 115 regarding successful creation of translated message 175 and/or successful translation of message 155 to output language 160.

At block 250, application 165 may receive an identifier from translations server 115 linking to translated message 175. In some example aspects, the identifier may be part of the notification at block 245. The identifier may be an address corresponding to a location in database 180 where translated message 175 is stored. In other example embodiments, application 165 may receive translated message 175 instead of the identifier. Translated message 175 may be a text translation of message 155 in output language 160 or an audio translation of message 155 in output language 160.

Figure 3:
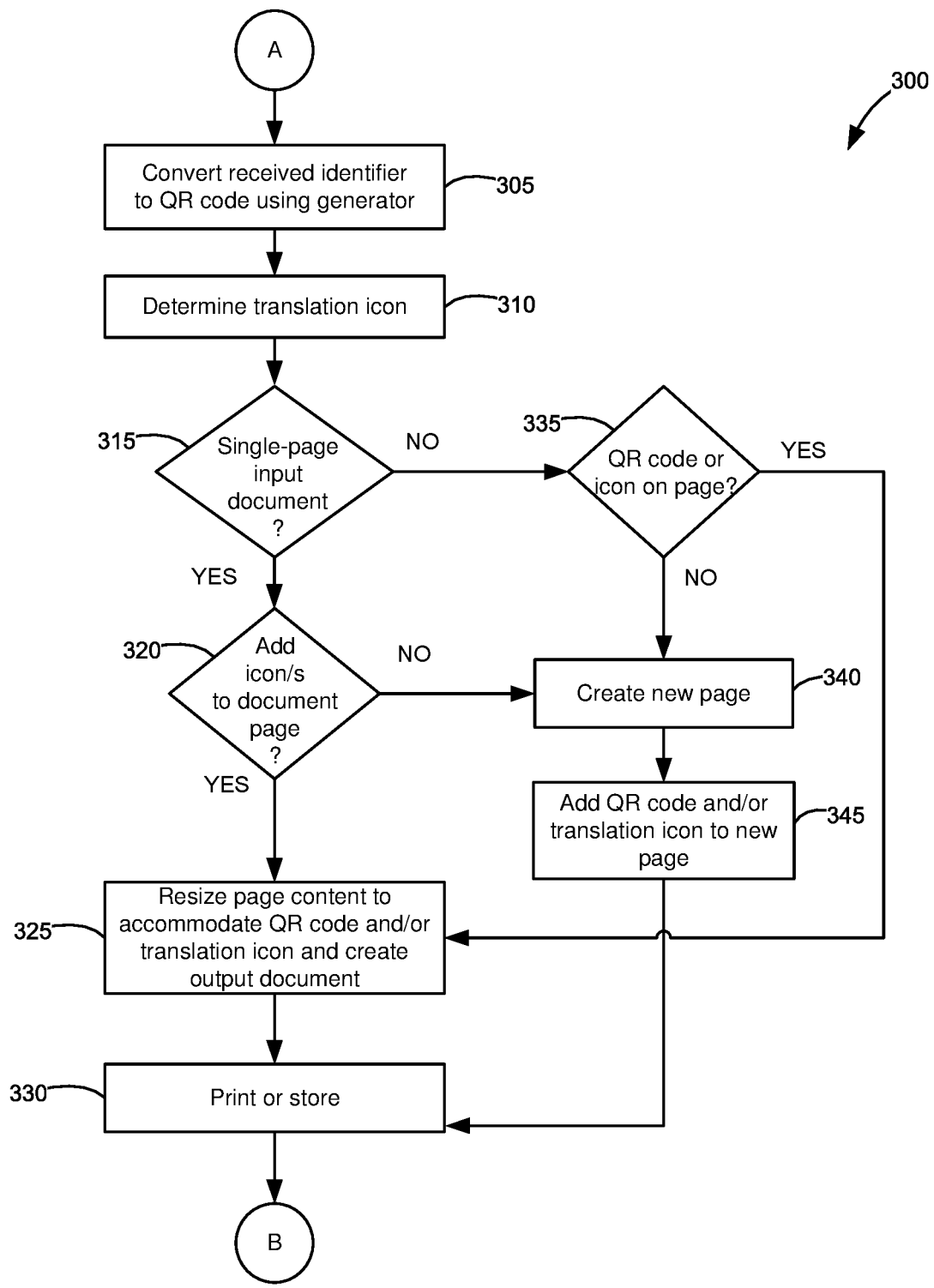
FIG. 3 is a flowchart of an example method for processing an input document, according to one example embodiment.

FIG. 3 is a flowchart of an example method 300 for processing input document 105, according to one example embodiment. Blocks 305-320 may be performed following example method 200 in FIG. 2. Example method 300 may be performed by application 165 in imaging device 110.

At block 305, application 165 may convert the identifier received at block 250 in example method 200 of FIG. 2 to QR code 185 using generator 170 in imaging device 110. Methods of converting a link to a QR code may be known to those skilled in the art.

At block 310, application 165 may determine an appropriate icon or translation icon 190. As discussed above, translation icon 190 may be dependent on an original language of message 155 and output language 160. Other types of visual representations to complement QR code 185 besides translation icon 190 may be apparent to those skilled in the art. Block 310 may also be optional such that no other icons aside from QR code 185 may be present on output document 120.

At block 315, application 165 may determine whether input document 105 is a single-page document or a multiple-page document. Upon a determination that input document 105 is a single-page document, application 165 may proceed to perform the action in block 320. Otherwise, application 165 may proceed to block 335.

At block 320, following a determination that input document 105 is a single-page document, application 165 may then determine whether to add QR code 185 and/or translation icon 190 to input document 105. Upon a determination to add QR code 185 and/or translation icon 190 to input document 105, application may proceed to perform the action in block 325. Otherwise, application 165 may proceed to block 340.

In one example embodiment, application 165 may determine whether it is pre-configured in imaging device 110 to add QR code 185 and translation icon 190 to all single-page input documents. In another example embodiment, application 165 may generate a display on display screen 142 of imaging device 110 asking owner 136 of input document 105 whether QR code 185 and/or translation icon 190 are desired to be added to single-page input document 105.

At block 325, following a determination that QR code 185 and/or translation icon 190 is desired to be added to input document 105, application 165 may resize a content of input document 105 to accommodate the inclusion of QR code 185 (block 305) and/or translation icon 190 (block 310) prior to creating output document 120. In one example embodiment, a size of a raster image of input document 105 relative to a media sheet page, as stored in a memory (not shown) of imaging device 110, may be reduced. For example, the raster image may be rescaled to about 80%.

A location of QR code 185 and/or translation icon 190 relative to the resized content of input document 105 may be predetermined in application 165. For example, and as shown in FIG. 1, QR code 185 and/or translation icon 190 may be predetermined to be located along a bottom portion of a media sheet page of output document 120. In other example embodiments, application 165 may allow owner 136 of input document 105 to select a location of QR code 185 and/or translation icon 190 relative to content of input document 105 following the resizing. For example, in some example aspects, QR code 185 and/or translation icon 190 may be located along a side of the media sheet page adjacent a content of output document 120. In other example aspects, QR code 185 may be located on a back portion of output document 120 when input document 105 is a one-sided document.

At block 330, application 165 may print a hardcopy of output document 120. In some example aspects, application 165 may store output document 120 as an electronic document in lieu of or in addition to printing a hard copy of output document 120. A preview of output document 120 may be provided to owner 136 prior printing or storing in some example embodiments. A location of QR code 185 and/or translation icon 190 on a media sheet may be adjusted or modified by owner 136 using an input device and display screen 142 of imaging device 110 prior to printing or storing output document 120. As such, QR code 185 and/or translation icon 190 may be appear at another location instead of at the predetermined location. Output document 120 may be stored in a memory (not shown) of imaging device 110 or in database 180 of translations server 115.

With reference back to block 315, following a determination that input document 105 is a multiple-page document, application 165 (at block 335) may determine whether QR code 185 and/or translation icon 190 are predetermined to be positioned on one or more pages of multiple-page input document 105. Upon a determination that one or more pages of the multiple-page input document 105 are to include QR code 185 and/or translation icon 190, application 165 may resize the content of each such determined page of input document 105 to accommodate the placement of QR code 185 and/or translation icon 190 on each such determined page (block 325).

At block 340, following a determination that multiple-page input document 105 does not include one or more pages on which QR code 185 and/or translation icon 190 may be positioned, application 165 may create a new page associated with input document 105 and output document 120.

At block 345, application 165 may then add QR code 185 and/or translation icon 190 to the created new page. In one example embodiment, application 165 may add QR code 185 and/or translation icon 190 at a predetermined location of the created new page. In another example embodiment, application 165 may generate a display on display screen 142 of imaging device 110 asking owner 136 of input document 105 for a position to locate QR code 185 and/or translation icon 190 on the created new page. Following the addition of QR code 185 and/or translation icon 190 to the created new page, application 165 may proceed to performing the action in block 330, as described above.

Figure 4:
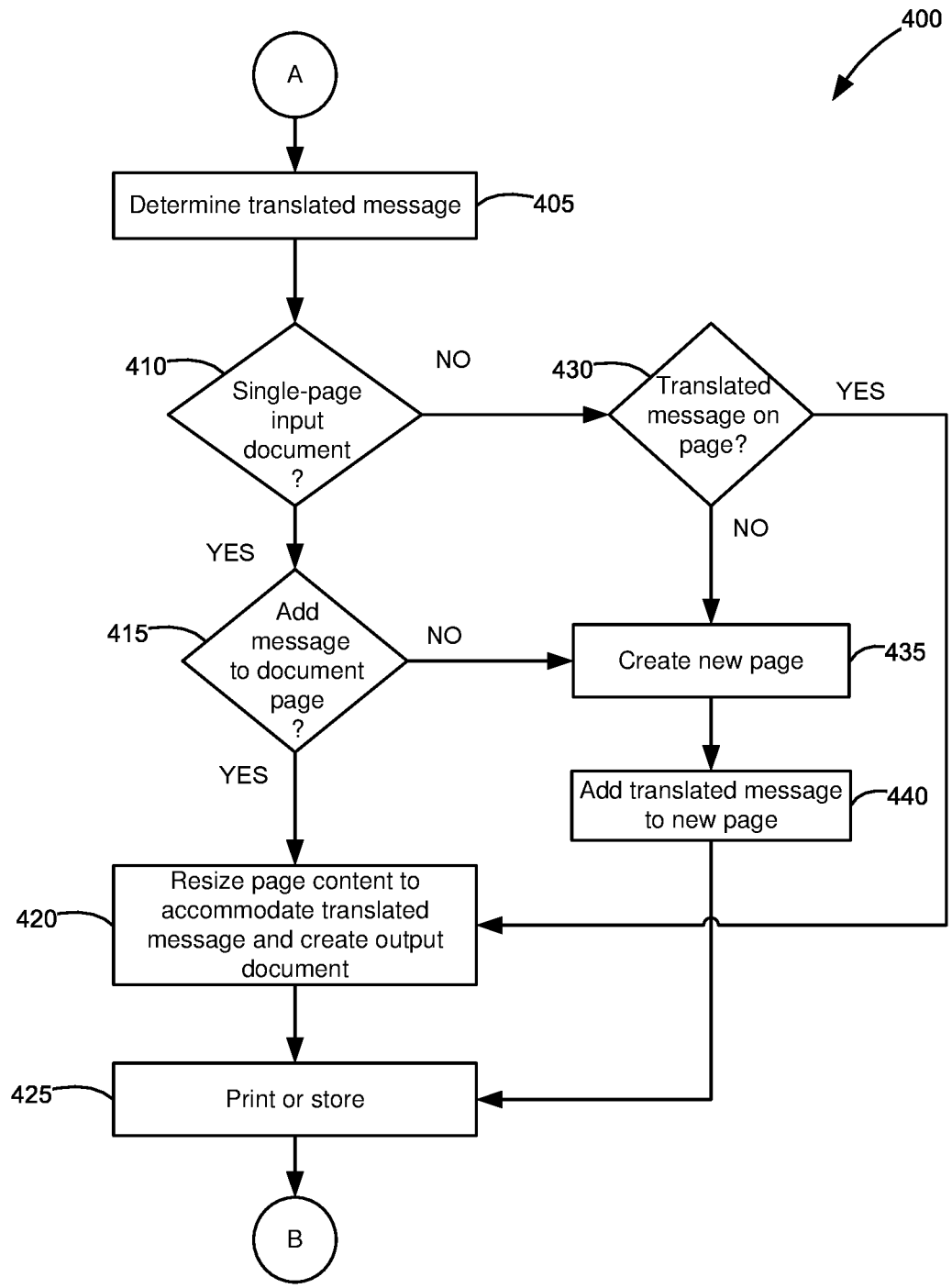
FIG. 4 is a flowchart of an example method for processing an input document, according to another example embodiment.

FIG. 4 is a flowchart of an example method 400 for processing input document 105, according to another example embodiment. Blocks 405-425 may be performed following example method 200 of FIG. 2. Example method 400 may also be performed by application 165 in imaging device 110.

At block 405, application 165 may determine translated message 175 based upon the identifier received in block 250 of method 200 (FIG. 2). In one example embodiment, application 165 may retrieve translated message 175 from database 180 of translations server 115 using the identifier received from translations server 115. In another example embodiment, application 165 may request translated message 175 from translations server 115. In this example embodiment, application 165 may indicate the identifier when sending the request. Application 165 may receive translated message 175 from translations server 115 following the request.

At block 410, application 165 may determine whether input document 105 is a single-page document or a multiple-page document. Upon a determination that input document 105 is a single-page document, application 165 may proceed to perform the action in block 415. Otherwise, application 165 may proceed to block 430.

At block 415, following a determination that input document 105 is a single-page document, application 165 may then determine whether to add translated message 175 to input document 105. Upon a determination to add translated message 175 to input document 105, application 165 may proceed to perform the action in block 420. Otherwise, application 165 may proceed to block 435.

In one example embodiment, application 165 may determine whether it is pre-configured in imaging device 110 to add translated message 175 to all single-page input documents. In another example embodiment, application 165 may generate a display on display screen 142 of imaging device 110 asking owner 136 of input document 105 whether translated message 175 is desired to be added to single-page input document 105.

At block 420, following a determination that translated message 175 is to be added to input document 105, application 165 may resize a content of input document 105 to accommodate translated message 175 and to create output document 120. In one example embodiment, a size of a raster image of input document 105 relative to a media sheet page, as stored in a memory (not shown) of imaging device 110, may be reduced. For example, the raster image may be rescaled to about 80%.

A location of translated message 175 relative to the resized content of input document 105 may be predetermined in application 165. Similar to QR code 185 and translation icon 190, translated message 175 may be predetermined to be located along a bottom portion of a media sheet page. In this example embodiment, message 155 may be limited to a predetermined number of words or characters for translated message 175 in order to fit both translated message 175 and the content of input document 105 on a media sheet page. In other example embodiments, application 165 may allow owner 136 of input document 105 to select a location of translated message 175 relative to content of input document 105 following the resizing. In some other example embodiments, application 165 may allow owner 136 of input document 105 to customize the amount of area or space for translated message 175. In some example aspects, translated message 175 may be located along a side of the media sheet page adjacent a content of output document 120. In other example aspects, translated message 175 may be placed on a back portion of output document 120 when input document 105 is a single-sided document.

At block 425, application 165 may print a hardcopy of output document 120. In some example aspects, application 165 may store output document 120 as an electronic document in lieu of or in addition to printing a hardcopy of output document 120. A preview of output document 120 may be provided to owner 136 prior printing or storing in some example embodiments. A location of translated message 175 on a media sheet may be adjusted or modified by owner 136 using an input device and display screen 142 of imaging device 110 prior to printing or storing output document 120. As such, translated message 175 may be placed at a different location on a media sheet page instead of the predetermined location. Output document 120 may be stored in a memory (not shown) of imaging device 110 or in database 180 of translations server 115.

At block 430, following a determination that input document 105 is a multiple-page document, application 165 may determine whether translated message 175 is predetermined to be positioned on one or more pages of multiple-page input document 105. Upon a determination that one or more pages of the multiple-page input document 105 are to include translated message 175, application 165 may resize the content of each such determined page of input document 105 to accommodate the placement of translated message 175 on each such determined page (block 420).

At block 435, following a determination that multiple-page input document 105 does not include one or more pages on which translated message 175 may be positioned, application 165 may create a new page associated with input document 105 and output document 120.

At block 440, application 165 may add translated message 175 to the created new page. In one example embodiment, application 165 may add translated message 175 at a pre-determined location of the created new page. In another example embodiment, application 165 may generate a display on display screen 142 of imaging device 110 asking owner 136 of input document 105 for a position to locate translated message 175 on the created new page. Following the addition of translated message 175 to the created new page, application 165 may proceed to performing the action in block 425, as described above.

The resulting pages at block 345 (FIG. 3) and block 440 (FIG. 4) may be treated as part of output document 120. In one example embodiment, when selecting documents to be printed on imaging device 105, application 165 may present input document 105 and the newly created page for the user to select for printing. Input document 105 and/or the newly created page may be printed upon user request. In other example embodiments, the resulting page at block 345 may be appended to input document 105. As such, when input document 105 is printed, the resulting page may also be printed. The appended page may be configured as a cover page of output document 120. In some alternate example embodiments, the appended page may be configured as an end page for output document 120.

Figure 5:
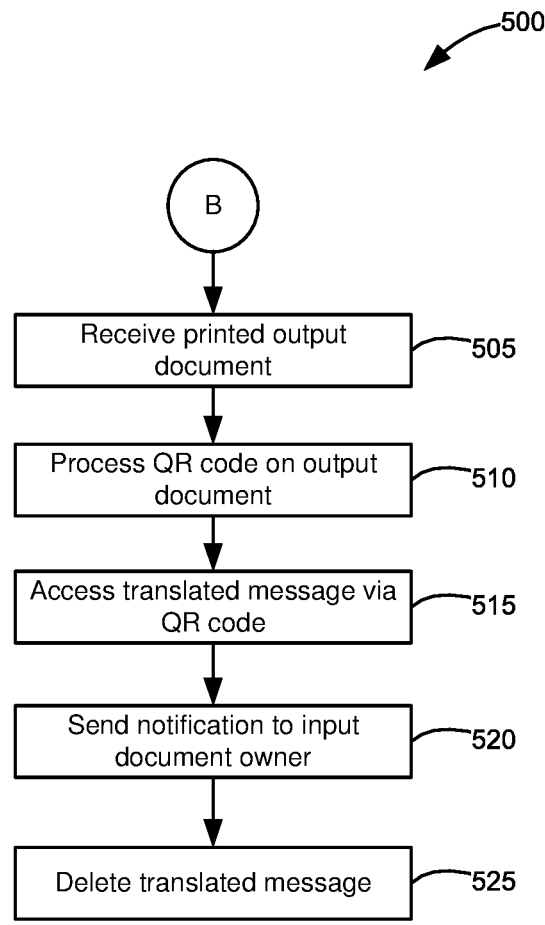
FIG. 5 is a flowchart of an example method for processing a document generated from performing the example method in FIG. 3.

FIG. 5 is a flowchart of an example method 500 for processing output document 120. Blocks 505-525 of example method 500 may be performed following the performance of example method 300 of FIG. 3. Output document 120 in FIG. 5 refers to the example embodiment where QR code 185 and/or translation icon 190 are incorporated into output document 120, as discussed in FIG. 3.

At block 505, receiver 130 may receive output document 120. In one example embodiment, owner 136 may physically hand over output document 120 to receiver 130. In other example embodiments, output document 120 may be scanned and a scanned image of output document 120 may be provided to receiver 130. Copies of output document 120 may be provided to multiple receivers which may include receiver 130.

At block 510, receiver 130 may process QR code 185 on output document 120. Receiver 130 may use reader 195 on computing device 133 to process QR code 185. A camera (not shown) of computing device 133 may be used to scan QR code 185. Scanning QR code 185 links reader 195 to an identifier in database 180 where translated message 175 is stored.

At block 515, receiver 130 may access translated message 175 following processing of QR code 185. Translated message 175 may be viewed following the processing of QR code 185. Reader 195 may include an instruction to retrieve translated message 175 from the identifier at block 510 or to request translations server 115 to send translated message 175 to computing device 133 using the identifier. Translated message 175 may be outputted in reader 195. In one example embodiment, translated message 175 may be played as an audio output in reader 195 of computing device 133. In another example embodiment, translated message 175 may be displayed as a text output in reader 195 of computing device 133. Reader 195 may include a browser for displaying translated message 175 on computing device 133. In other example embodiments, reader 195 may execute another application to play audio content and/or display text content of translated message 175 on computing device 133.

At block 520, following access of translated message 175, translations server 175 may send a notification to owner 136 of input document 105 notifying owner 136 that translated message 175 has been accessed (i.e., listened to, opened by or read by) receiver 130. In some example embodiments, a notification may also be configured to be sent to an administrator of translations server 115 (not shown). In other example embodiments, translations server 175 may send a notification to receiver 130 that a notification has been sent to owner 136 regarding access of translated message 175.

At block 525, upon a determination that translated message 175 has been accessed, translations server 175 may delete translated message 175 in database 180. In some example embodiments, translated message 175 may be automatically deleted in translations server 115 upon a determination that translated message 175 has been accessed. In some example aspects, translations server 175 may also delete instruction 150 received from imaging device 110. In other example embodiments, translated message 175 may be deleted after a predetermined period of storage in database 180. For example, in some example aspects, translations server 175 may include an instruction to delete translated message 175 following a determination that a month has passed without translated message 175 being accessed. In other example aspects, translations server 175 may include an instruction to delete translated message 175 a predetermined amount of time after translated message 175 was stored in database 180.

In another example embodiment, QR code 185 may also store (in addition to a link to translated message 175) information regarding owner 136, such as contact information of owner 136. In this manner, receiver 130 may be able to directly contact owner 136 regarding the communication received when scanning QR code 185 on computing device 133. In other example embodiments, while application 165 is illustrated as an application installed in imaging device 110, application 165 may be a web-based application accessible through a web browser on imaging device 110. In this example embodiment, application 165 may be accessible via imaging device 110 and/or a computing device of owner 136. For example, owner 136 may access application 165 via the computing device and may provide instruction 150 associated with input document 105 to imaging device 110. In the same example embodiment, following the transmission of input document 105 and instruction 150 to imaging device 110, owner 136 may access application 165 via imaging device 110 and select input document 105 and instruction 150 for processing in imaging device 110.

The abovementioned example methods leverage features of imaging devices, which typically includes printing, scanning, copying, faxing, and/or e-mailing, to include a solution to the abovementioned problem of providing communications to people of different language backgrounds. Using the abovementioned example methods, a document may be provided to people of different language backgrounds with the assurance that they may be able to execute actions related to the handling of the document since a translation of the instructions is provided with the document. For example, copies of a document with the same instruction (e.g., that there will be a parent meeting on Monday) may be reproduced with a link to or with a translation of the instruction or information in different languages based upon a language background of the receiving party.

It will be appreciated that the actions described and shown in the example flowcharts may be carried out or performed in any suitable order. It will also be appreciated that not all of the actions described in FIGS. 2-5 need to be performed in accordance with the example embodiments and/or additional actions may be performed in accordance with other example embodiments.

Many modifications and other embodiments of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific example embodiments disclosed and that modifications and other embodiments are intended to be included within the scope of the appended claims. The machine-readable code associated with the document being processed as described above may also be used in the same or similar manner in another industry, such as healthcare, to provide a language and/or an accessibility solution. Although specific terms are employed herein, they are used in a generic and descriptive sense only and not for purposes of limitation.

What is claimed is:

1. A method of processing a document at an imaging device, comprising:
   receiving a message associated with the document;
   transmitting the message to a server communicatively connected to the imaging device;
   receiving an identifier of the message as stored in the server;
   converting the identifier to an image scannable by a mobile device;
   adding the image to an output page of the document;
   determining whether the document is one of a single-page document and a multiple-page document prior to the adding the image to the output page; and
   wherein upon the determination that the document is a single-page document, determining whether to add the image to the single-page document, and upon a positive determination, resizing a content of the document prior the adding the image to the output page.

2. The method of claim 1, further comprising receiving a pre-printed document on the imaging device.

3. The method of claim 1, further comprising receiving at least one of an input language and an output language for the message and sending the at least one of the input language and the output language to the server, wherein the identifier leads a user of the mobile device to a translation of the message from the input language to the output language as stored in the server.

4. The method of claim 1, further comprising storing the output page upon receiving a request to store the output page, wherein the output page is stored in at least one of the imaging device and the server.

5. The method of claim 1, further comprising determining whether the message as stored in the server has been accessed by a user and sending a notification to an owner of the document upon a positive determination.

6. A method of processing a document at an imaging device, comprising:
   receiving a message associated with the document and an output language for the message;

sending the message and the output language to a server communicatively connected to the imaging device;
receiving an identifier of a translation of the message in the output language from the server;
generating a scannable image using the identifier;
adding the scannable image to an output page;
determining whether the document is one of a single-page document and a multiple-page document; and
wherein the adding the scannable image to the output page is performed upon the determination that the document is a single-page document and upon a determination that the scannable image is not to be added to the single-page document.

7. The method of claim 6, wherein the adding the scannable image to the output page comprises adding the scannable image to a user-selected portion of the output page.

8. The method of claim 6, further comprising performing at least one of printing the output page and storing the output page in the imaging device.

9. The method of claim 6, wherein the output page is an output page separate from an output page of a document.

10. An imaging device having a non-transitory computer-readable storage medium containing one or more instructions for processing a document, the one or more instructions comprising an instruction to:
receive a message associated with the document;
send the message to a server communicatively connected to the imaging device;
receive an identifier of the message as stored in the server;
add the identifier to an output page of the document;
determine at least one of an input language and an output language for translating the message received; and
send the at least one of the input language and the output language to the server,
wherein the identifier of the message links to a translation of the message in the output language.

11. The imaging device of claim 10, wherein the instruction to receive the message comprises an instruction to receive the message from a user via at least one of a keypad and an audio receiver communicatively coupled to the imaging device.

12. The imaging device of claim 10, wherein the imaging device further comprises an instruction to:
generate a code readable by a mobile device following receipt of the identifier; and add the code to the output page.

13. The imaging device of claim 10, wherein the imaging device further comprises an instruction to resize a content of the output page prior to performing the instruction to add the identifier to the output page.

14. A method of processing a document at an imaging device, comprising:
receiving a message associated with the document;
transmitting the message to a server communicatively connected to the imaging device;
receiving an identifier of the message as stored in the server;
converting the identifier to an image scannable by a mobile device;
adding the image to an output page of the document; and
receiving at least one of an input language and an output language for the message and sending the at least one of the input language and the output language to the server, wherein the identifier leads a user of the mobile device to a translation of the message from the input language to the output language as stored in the server.

15. A method of processing a document at an imaging device, comprising:
receiving a message associated with the document;
transmitting the message to a server communicatively connected to the imaging device;
receiving an identifier of the message as stored in the server;
converting the identifier to an image scannable by a mobile device;
adding the image to an output page of the document; and
determining whether the message as stored in the server has been accessed by a user and sending a notification to an owner of the document upon a positive determination.

16. A method of processing a document at an imaging device, comprising:
receiving a message associated with the document and an output language for the message;
sending the message and the output language to a server communicatively connected to the imaging device;
receiving an identifier of a translation of the message in the output language from the server;
generating a scannable image using the identifier;
adding the scannable image to an output page;
determining whether the document is one of a single-page document and a multiple-page document; and
wherein adding the scannable image to the output page is performed upon the determination that the document is a multiple-page document and upon a determination that the multiple-page document does not include one or more predetermined pages for containing the image.

17. An imaging device having a non-transitory computer-readable storage medium containing one or more instructions for processing a document, the one or more instructions comprising an instruction to:
receive a message associated with the document;
send the message to a server communicatively connected to the imaging device;
receive an identifier of the message as stored in the server;
add the identifier to an output page of the document; and
resize a content of the output page prior to performing the instruction to add the identifier to the output page.

18. A method of processing a document at an imaging device, comprising:
receiving a message associated with the document;
transmitting the message to a server communicatively connected to the imaging device;
receiving an identifier of the message as stored in the server;
converting the identifier to an image scannable by a mobile device;
adding the image to an output page of the document;
determining whether the document is one of a single-page document and a multiple-page document prior to the adding the image to the output page; and
wherein upon a determination that the document is a multiple-page document, determining whether the multiple-page document includes one or more predetermined pages for containing the image, and upon a positive determination, resizing a content of each predetermined page of the one or more predetermined pages prior to the adding the image to each predetermined output page.

* * * * *